United States Patent [19]
Shumate et al.

[11] Patent Number: 5,249,511
[45] Date of Patent: Oct. 5, 1993

[54] BULK COOKING OIL DISTRIBUTION AND WASTE REMOVAL SYSTEM

[76] Inventors: Eldridge J. Shumate, 1273 Parkway Gardens Ct., Unit #107; Enoch E. Olsen, 1277 Parkway Gardens Ct., Unit #122, both of, Louisville, Ky. 40217

[21] Appl. No.: 15,367

[22] Filed: Feb. 9, 1993

[51] Int. Cl.⁵ .............................................. A47J 37/12
[52] U.S. Cl. ...................................... 99/408; 99/403; 137/358; 141/1; 141/82; 210/167; 210/DIG. 8
[58] Field of Search ................ 99/330, 403, 408, 516, 99/407; 210/DIG. 8, 167, 461, 486, 489; 126/391, 351, 374; 141/1, 82; 137/358, 356, 360, 1; 426/438

[56] References Cited

U.S. PATENT DOCUMENTS

| | | | |
|---|---|---|---|
| 3,762,394 | 10/1973 | Newcomer | 99/330 X |
| 4,360,046 | 11/1982 | Streit et al. | 141/82 |
| 4,485,831 | 12/1984 | Ungerleider | 137/1 |
| 4,646,793 | 3/1987 | Sherratt | 137/358 X |
| 4,684,412 | 8/1987 | Fritzsche | 210/DIG. 8 |
| 4,704,290 | 11/1987 | Fritzsche | 426/438 |
| 4,882,984 | 11/1989 | Eves, II | 99/408 |
| 4,913,038 | 4/1990 | Burkett et al. | 99/331 |
| 4,962,698 | 10/1990 | Drijftholt et al. | 210/167 X |
| 4,975,206 | 12/1990 | Turman | 210/142 X |
| 5,179,891 | 1/1993 | Chiu | 99/403 X |

Primary Examiner—Timothy F. Simone
Attorney, Agent, or Firm—Vance A. Smith

[57] ABSTRACT

A bulk cooking oil system has filter, waste, supply, and fryer stations connected by piping for movement of oil along preselected pipe paths. The filter station functions to filter cooking oil from the fryer station and has a valve adapted to open and close pipe lines that lead to and away from the filter station. The waste station stores used oil and has a valve adapted to open and close a pipe line leading to and away from the waste station. The supply station stores oil to be used at the fryer station for cooking food products and also has a valve adapted to open and close a pipe line leading to and away from the supply station. The fryer station has a fryer that receives and heats the cooking oil to cook food products and a valve adapted to open and close a pipe line leading to and away from the fryer station. All of the various valves are selectively operated and controlled so that a predetermined pipe path can be established between identified stations. A pump moves the oil along the selected pipe path.

15 Claims, 8 Drawing Sheets

FIG. 1

| CYCLE | FILTER | | WASTE | | SUPPLY | | FRYER | | |
|---|---|---|---|---|---|---|---|---|---|
| | VALVE 26 | VALVE 28 | VALVE 32 | VALVE 36 | VALVE 38 | VALVE 40 | VALVE 46 | VALVE 48 | TRIGGER 52 |
| 1 | C | C | C | CL | O | C | C | C | C |
| 2 | C | C | C | CL | CL | O | O | C | SQUEEZE S |
| 3 | O | C | C | CL | CL | C | C | O | SQUEEZE S |
| 4 | O | O | C | CL | CL | C | C | C | C |
| 5 | C | O | O | CL | CL | C | O | C | SQUEEZE S |
| 6 | C | C | O | CL | CL | C | C | O | SQUEEZE S |
| 7 | C | O | C | CL | CL | C | C | C | C |
| 8 | C | C | C | O | CL | C | C | C | C |

VALVE OPERATION

O = OPEN
C = CLOSE
L = LOCKED
S = SQUEEZE

BULK COOKING OIL DISTRIBUTION AND WASTE REMOVAL SYSTEM

BACKGROUND OF THE INVENTION

1. Field of the Invention

This invention relates to systems and apparatus for the use of cooking oil and, more particularly, relates to systems and apparatus for the distribution, filtering, removal, and disposal of cooking oil.

2. Description of the Prior Art

The business of supplying cooking oil to facilities to prepare foods of all types and recycling waste oil is extensive. To a great extent kitchen facilities employ antiquated techniques resulting in cleanliness problems and exposing kitchen workers to significant hazards. Fryer cooking oil is typically contained either as a liquid in jugs of 35 pounds of weight or more or as a solid in paper cardboard boxes with a plastic liner. The oil is generally stored in location near the cooking facility and manually brought to and emptied into the cooking or frying vat. The empty containers, i.e., jugs or cardboard box containers and plastic liners, then are returned to storage for ultimate disposal in a dumpster. The containers occupy considerable volume and often necessitate frequent emptying of the dumpster, an extra cost to business.

The weight of the full containers, usually 35 to 50 pounds in weight, requires that the worker have sufficient strength to carry the container to the frying vat and pour the contents into the vat. The requirement of such strength frequently prevents assigning such jobs to smaller, less physically strong, personnel. Even when personnel capable of handling the containers are used, spillage often occurs. This is not only undesirable from a health point of view but is a physical hazard due to the slickness of the oil on the floor as workers continue to do their job, often in close proximity to cooking equipment heated to elevated temperatures.

When solid shortening is used, the container housing a fifty pound cube of shortening is opened and portions of the shortening removed from the container, placed in a small pan or bucket, then carried to and dropped into the fryer vessel. The fryer itself may be empty and the solid shortening heated and thus melted to the desired temperature. Frequently, however, the fryer vessel may be partially filled with hot oil and the additional solid dropped into it. The impact of the solid shortening with the heated oil causes splashing, an extremely undesirable occurrence.

During the cooking process it is desirable to eliminate the carbonized food particles that become impregnated in the liquid oil during use. A typical and the simplest way to accomplish the filtering is to drain the hot oil (300° F. to 375° F.) into a pan rectangular or circular, for example, usually about 2 feet in diameter with sides and an open top. The pan will have a filter screen in the bottom and a pump on top. The pump sucks the oil through the filter and discharges the oil back into the body of the oil located in the pan. An agglomerating agent such as magnesium silicate may be added to agglomerate carbon particles into larger particles to facilitate filtering. Following a typical circulation through, e.g., about 5 to 15 minutes, the recycled oil is then discharged into a fryer from the pan. Another technique employs a mobile filter that can be attached directly to the fryer drain and a pump that may continuously recirculate the oil through the filter. Typical recycling requirements necessitate the oil to be filtered as often as three or four times daily with concomitant cleaning or disposal of the filter elements.

Cooking oil does degrade after a period of time due to continuous exposure to the atmosphere and various food constituents under elevated temperature conditions and must be discarded. When this occurs the waste oil is typically drained from the fryer, usually at elevated temperatures, into a container that is carried by hand to a disposal tank at the rear of the facility housing the cooking installation. The high temperatures of the oil expose the worker to possible burns of a severe nature should the skin come into contact with the heated oil. During removal of the hot oil from the kitchen area, spilling frequently occurs with flow behind the equipment itself. Tracking of the oil into the dining area from the kitchen facility is the inevitable result.

The waste cooking oil in the disposal tank is generally picked up at time intervals, generally 4 to 6 weeks, by a waste oil dealer with the frequency depending upon the amount of discharge by the cooking oil user. The waste oil can then be recycled into other useful products. The disposal tank is usually located in an area easily accessible to rodents and the like. Thus, aside from being unsightly and subject to spillage, it often poses a health hazard.

Various apparatus and processes have been devised to eliminate or minimize some of the problems discussed above. For example, U.S. Pat. No. 4,360,046 issued on Nov. 23, 1982 to Streit et al, describes a device to rid the cooking facilities of waste fatty oil including a means for maintaining the waste in liquid form for ease of handling. A similar type of apparatus is disclosed in U.S. Pat. No. 4,485,831 issued on Dec. 4, 1984 to Ungerleider.

U.S. Pat. No. 4,975,206 issued on Dec. 4, 1990 to Turman describes a cooking oil filtering method in which the oil in the cooking vats is circulated through a filter and then back to the vats. Many of the carbonized food particles are removed minimizing contamination of the oil and permitting use thereof. The cleaning process is automated to take place at regular intervals.

Still another U.S. Pat. No. 4,646,793 issued Mar. 3, 1987 to Sherratt describes a system in which the oil is distributed from a holding tank to the cooking vat as needed and removed from the vat when deemed to be waste to a locked tank that can be emptied from time to time.

None of the references above provide for a simple and economical system and apparatus. For example, the prior art is devoid of systems and apparatus that provide for the distribution, filtering and removal of oil in a manner that collectively and completely avoids the problems caused by the (i) handling of the oil initially, (ii) handling when at elevated temperatures, (iii) filtering of the oil at selected intervals, and (iv) disposing of the oil at selected intervals.

It is therefore an object of the present invention to provide a process and system eliminating the manual handling of cooking oil in cooking establishments It is another object of the present invention to eliminate the wasteful use of plastic and paper receptacles containing liquid or solid cooking oil products.

It is still another object of the present invention to provide for a system having an improved filtering capability.

It is yet another object of the present invention to provide for a portable apparatus embodying the system of the present invention that can hold and distribute fresh oil, filter and recirculate used oil, and store and eliminate waste oil.

These and further objectives are accomplished by the system and apparatus of the present invention and will be best understood through a reading of the ensuing detailed description accompanied by the drawings.

SUMMARY OF THE PRESENT INVENTION

The following definitions apply in this summary and following disclosure. The term "piping" is used to generally define the network of pipe lines carrying the cooking oil and which form a component part of the system and apparatus described herein. The term "pipe line" defines a specific pipe line leading to or away from a station or oil container component of the present invention. Finally, the term "pipe path" defines a selected route composed of one or more pipe lines for carrying oil from one station or container component of the present invention to another.

In accordance with one embodiment of the present invention, a system for distributing and recirculating cooking oil comprises a filter station, a supply station, a waste station, a fryer station, piping interconnecting the various stations capable of carrying cooking oil between the stations, a valve controller for selecting a pipe path among said stations, and a pump for causing the oil to move along the selected pipe path. The filter station includes a filtering unit for filtering cooking oil from the fryer station and filter valves for opening and closing pipe lines leading to and away from the filter station. The waste station includes a container for storing used oil and waste valves for opening and closing pipe lines leading to and away from the waste station. The supply station includes a container for storing oil to be used at the fryer station for cooking food products and supply valves for opening and closing pipe lines leading to and away from the supply station. The fryer station includes a pipe line capable of metering oil to and from a selected fryer vat and fryer valves for selectively opening and closing pipe lines leading to and from the fryer station. Additionally, a safety sensing device may be installed which allows the supply and waste tanks to be shut off when a predetermined high oil level is reached.

The valve controller controls the operation of the various valves and selects a pipe path between stations along which oil flows under action by the pump. The valve controller may be either a manually or electrically operated controller.

DETAILED DESCRIPTION OF THE PREFERRED EMBODIMENT OF THE PRESENT INVENTION

Figure 1:
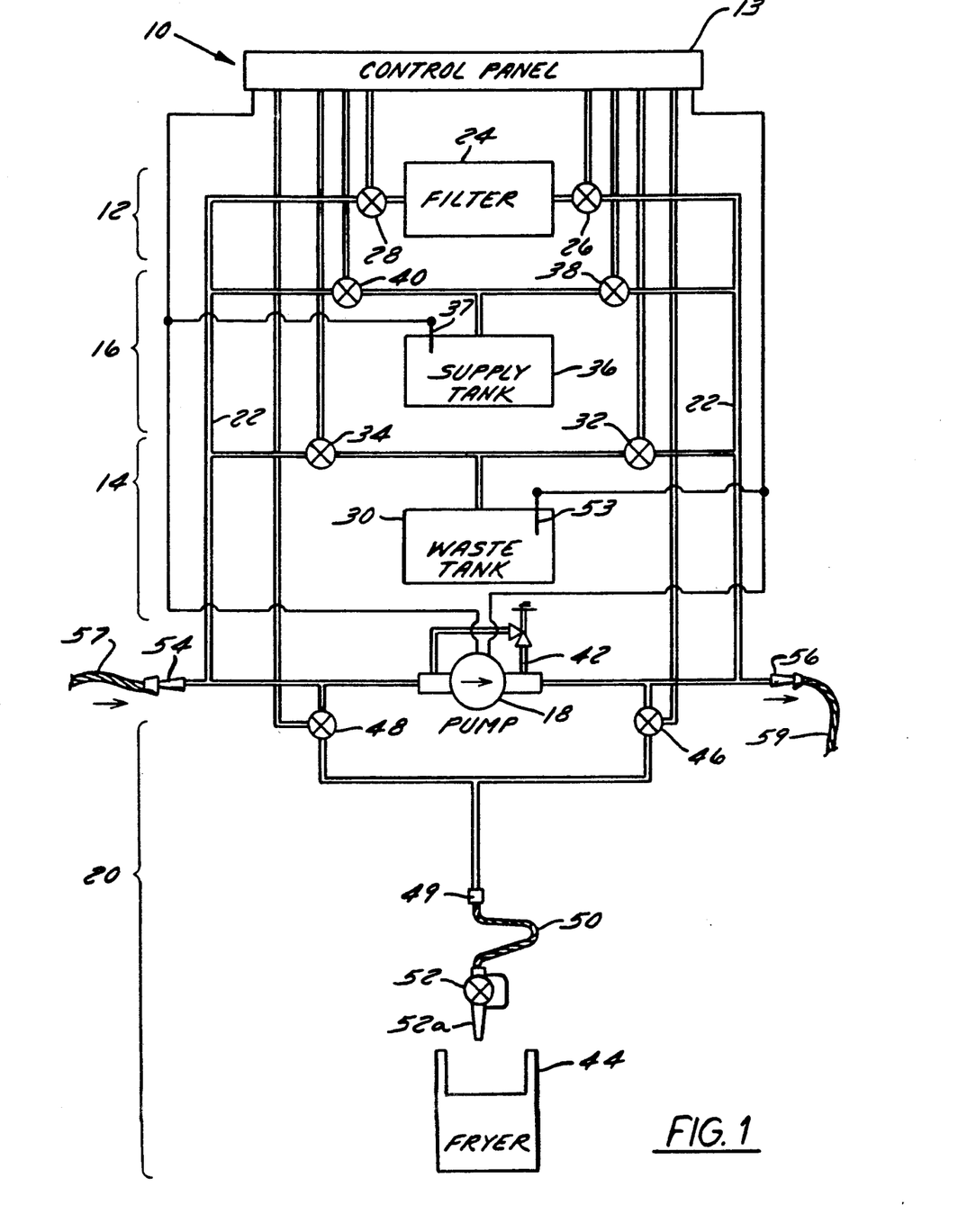
FIG. 1 is a schematic of the various stations, piping and valves of a system for the storing and distribution of fresh oil, the filtering and recirculation of used oil, and the storing and elimination from the system of waste oil in accordance with the present invention.

The system set forth schematically in FIG. 1, is depicted generally as character numeral 10. The system is comprised of 6 major elements: a filter station 12, a waste station 14, a supply station 16, a pump 18, a fryer station 20, and a valve panel controller 13. The stations are interconnected by piping shown generally by character numeral 22 capable of carrying the required flow of cooking oil between selected stations for the various purposes as described below.

Filter station 12 comprises a filter 24 and a pair of independently operated filter valves 26, 28 positioned respectively in the pipe lines leading to the entrance and exit sides of filter 24. For purposes of this description, the entrance to filter 24 is considered on the right side thereof while the exit is on the left side. Valves 26 and 28 ca be either manually operated or operated electronically as desired. The function of filter station 12 is to filter cooking oil still amenable to reuse except for the residue of carbon and food particles mixed with the oil from the cooking process. Once filtered, the oil can then be recirculated to fryer station 20 for reuse.

Waste station 14 comprises a waste receptacle 30 and, similar to filter station 12, a pair of independently operated entrance waste valve 32 and exit waste valve 34 positioned in the pipe line leading to the receptacle 30. As above, waste valves 32 and 34 may be operated either manually or electronically through a variety of well known valves. The function of waste station 14 is to store waste cooking oil which has been degraded beyond appropriate further use in the cooking process.

Supply station 16 comprises a supply storage tank 36 and a pair of independently operated entrance supply valve 38 and exit supply valve 40 positioned in the pipe line leading to tank 36. The function of supply station 16 is to receive and store fresh cooking oil and providing the same to fryer station 20 as appropriate.

Pump 18 functions to deliver cooking oil along whatever path is designed by the appropriate opening and closing of the various valves (as discussed below). Pump 18 is preferably continuously operated having a pressure sensitive relief valve 42 allowing flow from pump exit to pump entrance should all pipe paths be closed.

Fryer station 20 comprises a pair of valves 46 and 48 positioned in pipe lines intersecting with a coupling 49 attached to one end of flexible line 50. The other end of flexible line 50 contains squeezable nozzle valve 52 adapted to be inserted in a fryer vat 44. Like the valves discussed above, valves 46 and 48 are adapted to be operated independently. The function of the fryer station 20 is to allow the proper metering of fresh or recycled filtered oil into the fryer vat 44.

To supply fresh oil to the system, an outside line 57 leading to a remotely located source of fresh oil, such as a tank truck or a remotely located storage tank, is coupled to quick connect coupling attachment 54. To remove oil from system 10, quick connect coupling attachment 56 is coupled to outside line 59 leading to a remotely located storage facility such as a tanker truck for immediate removal.

Basically, the system is designed to operate in close synchronization with the needs of the user of kitchen cooking equipment. These needs vary from the introduction of fresh cooking oil into the system and metering of the oil into the frying vat, to the recycling/filtering of used cooking oil, and finally, to the complete removal of waste oil from the system. The various cycles to accomplish this are discussed below with reference to the operating sequence illustrated by FIG. 2.

Figure 2:
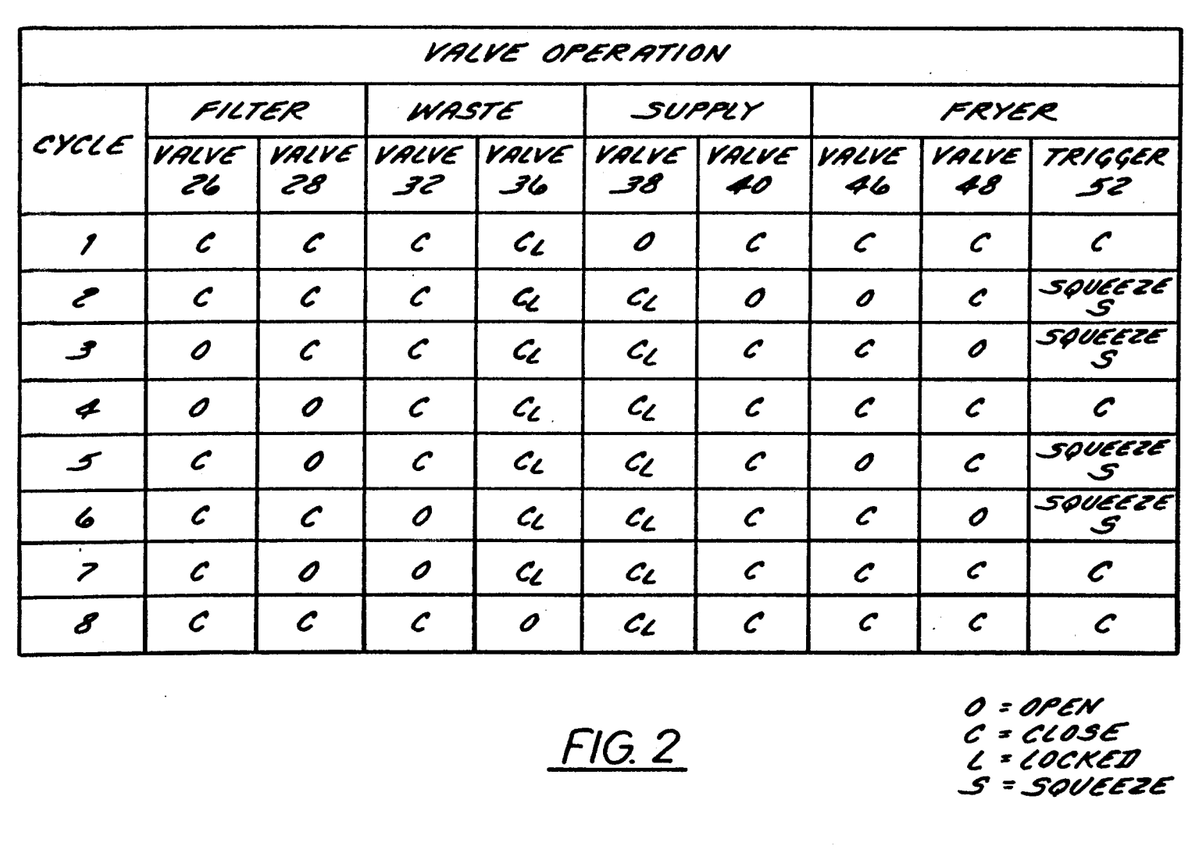
FIG. 2 is a table showing the operative sequence of the various valves of the system of FIG. 1.

When it is desired to place fresh oil in the system (cycle 1), attachment 54 is coupled to outside line 57 leading to a source of fresh oil, a tanker truck, and valve 38 is opened. Valve 40 is closed and all other stations are in the closed state in which each valve of that station is closed. The supply of oil is moved through the selected pipe path extending from coupling attachment 54 through pump 18 and into storage tank 36 via open valve 38. When tank 36 is filled or the oil reaches a desired level, valve 38 is then closed. A high oil level sensor 37 may be provided to shut off pump 18 when the oil reaches a predetermined level in tank 36.

Cycle 2 commences with the opening of supply valve 40 and fryer valve 46. All other valves remain closed. An operator then places trigger valve 52 having a nozzle 52a into a selected fryer vat and squeezes trigger valve 52 into an open position. Cooking oil follows the selected pipe path extending from tank 36 through open valve 38, pump 18, open valve 46, flexible line 50, and open trigger valve 52 into vat 44. When vat 44 reaches an appropriate level, trigger valve 52 is released, stopping the flow of oil. Valves 38 and 46 then are closed.

While cooking oil does tend to degrade over a period of extended use, it may have a continued useful life if the accumulated, largely colonized particles residing in the oil resulting from the cooking process could be removed. Thus, cycle 3 may be initiated when a determination is made that the oil could be reused if properly filtered. In cycle 3, the selected pipe path extends from fryer vat 44 into filter station 12 to filter 24. To choose such a pipe path, the operator opens valves 26 and 48, leaving all others closed. Nozzle 52a is placed into vat 44 and trigger valve 52 squeezed open. The unfiltered oil then is free to flow through along a pipe path extending from fryer vat 44 through open valves 52, 48 and 26 to filter 24. Nozzle 52a is then removed and valve 52 is allowed to close along with the closing of valves 26 and 48. To filter the used oil, the operator then initiates cycle 4 by re-opening valve 26 and opening valve 28, thus establishing a closed loop path extending from filter 44 through pump 18 and back to filter 44. Cycle 4 can be continued until the oil becomes as clean as permitted by the limits of the filter used As will be discussed in connection with an apparatus embodying system I0, filter 24 may be a container housing a removable filter element such as a bag. Oil moved into such a container is forced through the bag which retains particles too large to penetrate the bag walls. The bag once impregnated with particles may be removed and emptied, cleaned or replaced.

Once cycle 4 has been completed satisfactorily, cycle 5 may be initiated to return the filtered oil to fryer vat 44. This is accomplished by opening valves 28 and 46, inserting and squeezing trigger valve 52 into vat 44. Thus, a pipe path extending from filter 24 through valves 28, 46 through flexible line 50, valve 52 into frying vat 42 is selected.

Cycles 6 and 7 both function to place oil in waste receptacle 30 from fryer vat 44 in the case of cycle 6 and from filter 24 in the case of cycle 7. In cycle 6, valves 32 and 48 are open, all others closed, and valve 52 is inserted in vat 44 and squeezed. In cycle 7, valves 28 and 32 are open, all others being closed. A high oil level sensor 53 may be provided to shut pump 18 off when a predetermined oil level within tank 30 is reached.

To remove waste oil entirely from the system, attachment 56 is coupled to waste line 57 leading to a remote tanker or the like and valve 34 is opened. Waste oil then moves along a pipe path extending from waste receptacle 30 through valve 34 and attachment 56 out of system 10 entirely.

Selecting the pipe path selected for an appropriate cycle can be accomplished either by manually opening and closing appropriate valves as is discussed below, or electronically through a controller such as panel controller 13 that provides signals to the appropriate valves when a particular cycle is selected. Microprocessor controls for controlling the opening and closing solenoid operated valves are well known. Controller 13 may also automatically control the operation of pump 18, energizing it when a particular cycle is selected and de-energizing when the selected cycle is completed. Sensors 37 and 53 may be used to sense the upper permissible levels within respective tank 36 and receptacle 30 whereupon controller 13 automatically de-energizes pump 18.

From the above, it will be understood that operators using the system as described are not required to carry large, heavy quantities of oil to and from the vats and are not being exposed to significant contact with the usually high temperature oil. Spillage of cooking oil and the problems associated with it routinely accepted by many commercial kitchen and bakery facilities are largely minimized. The system of the present invention allows an operator to control the flow of oil through the selection of various pipe paths, allowing the functions of oil distribution, filtering, and removal to be accomplished without individuals handling the high temperature cooking oil or the need for housing large tanks of waste oil and the frequent disposal of large quantities of cardboard containers and plastics linings.

Figure 3:
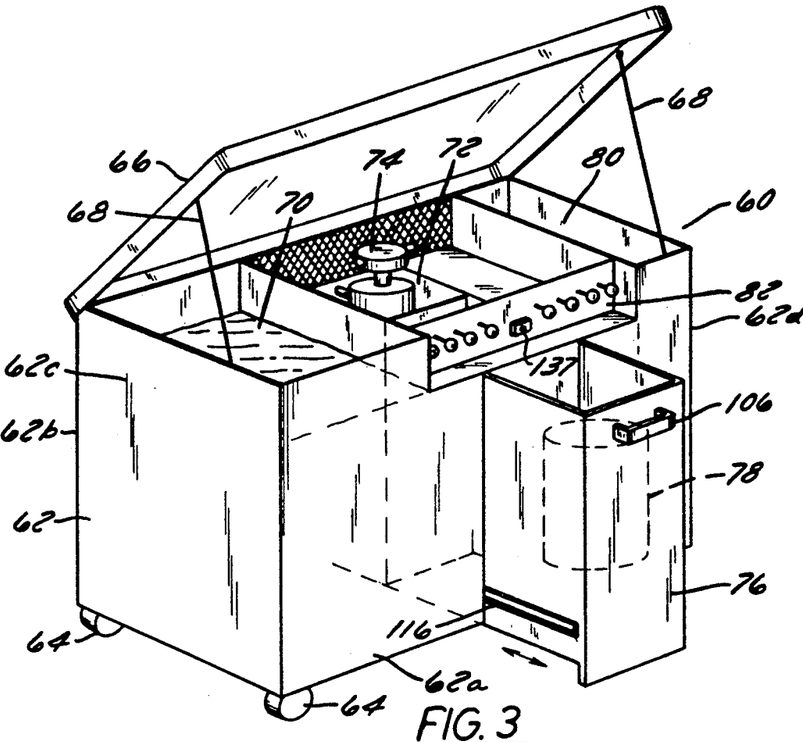
FIG. 3 is a perspective view of an apparatus in accordance with the present invention.

For a discussion of an apparatus embodying the foregoing system, reference is made to the perspective of FIG. 3 and the various views thereof provided by FIGS. 4-16. In FIG. 1 the components of an oil distribution and recycling apparatus depicted by character numeral 60 are contained within a housing 62 defined by its exterior walls, i.e., front wall 62a, back wall 62b, and sidewalls 62c and 62d. Housing 60 may be positioned on casters 64, allowing complete portability of the apparatus. A pivotable lid 66 is illustrated supported in the open position by support rods 68.

Figure 3A:
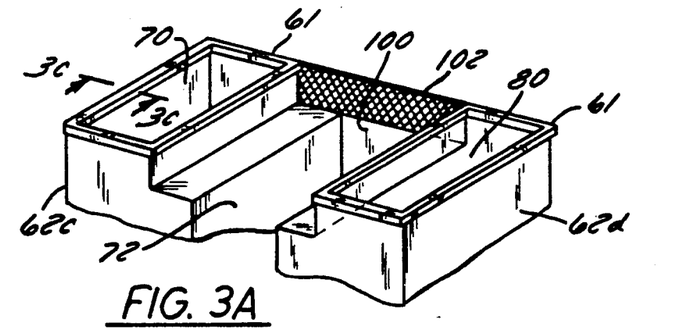
FIG. 3A is a different perspective view of the apparatus of FIG. 3 showing the separating walls of various compartments within the apparatus.
Figure 3B:
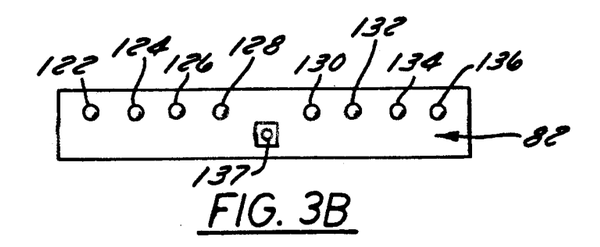
FIG. 3B is a front view of the recessed operation panel of the apparatus of FIG. 3.
Figure 3C:
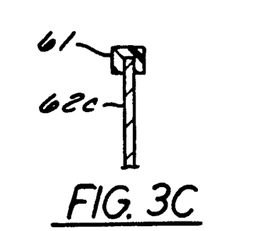
FIG. 3C is a sectional view taken along lines 3C—3C of FIG. 3A showing the gasket lining the top edge of the outer walls of the apparatus of FIG. 3.

The exterior walls of housing 62 may be constructed with a double wall separated by an air gap of about ½ inch, (or some other insulating material), and made from 18 gauge sheet steel. The air gap serves to insulate the outer wall from the high temperatures of the oil contained within. As best seen in FIGS. 3A and 3C, a gasket 61 compatible with the high temperatures of the cooking oil may line the top edges of the exterior walls and provide an insulating seal abutting a closed lid 66.

Figure 4:
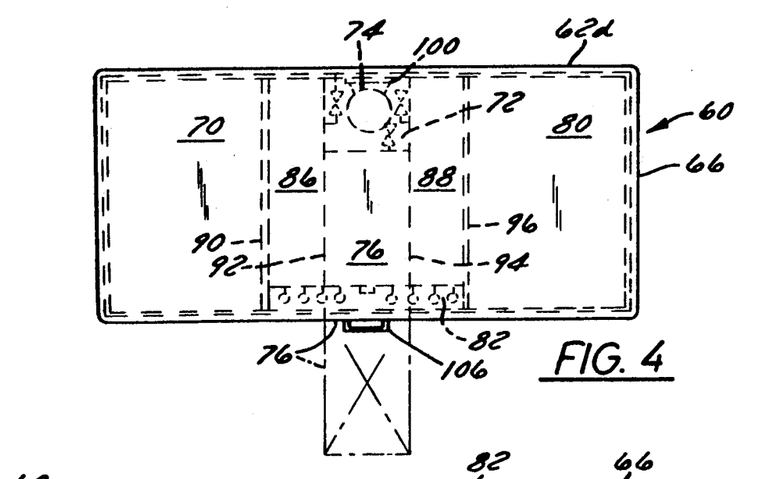
FIG. 4 is a top plan view, partially in section, of the apparatus of FIG. 3.
Figure 5:
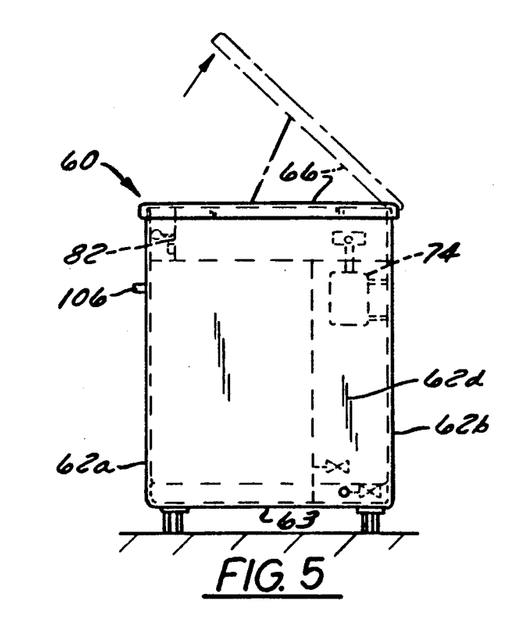
FIG. 5 is a side view, partially in section, of one end of the apparatus of FIG. 3.
Figure 6:
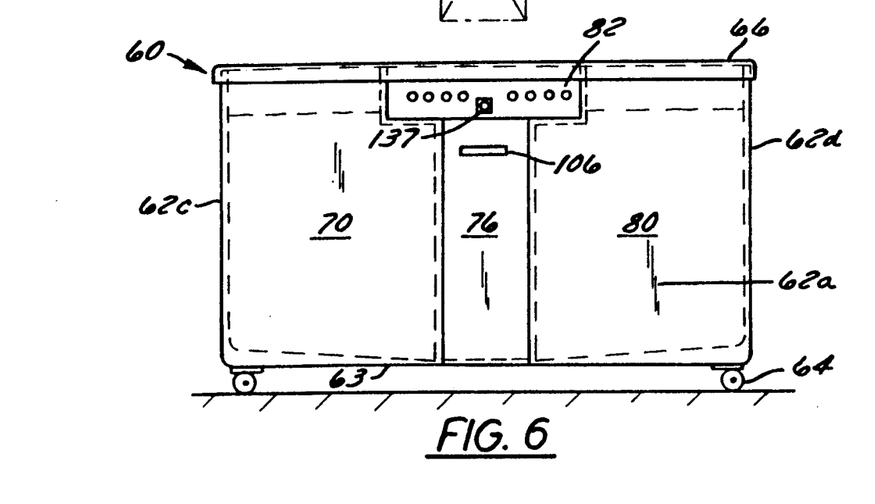
FIG. 6 is a front elevation view, partially in section, of one side of the apparatus of FIG. 3.

As best seen in FIGS. 3, 3A and 4, interior of the housing 62 is divided into several sections or compartments comprising tank 70, pump section containing pump section 72 containing pump 74, a movable filter housing 76 shown in the open position containing a removable filter 78 illustrated in dotted lines, and a waste tank 80. A recessed operating panel 82 is mounted on front wall 62a of housing 62.

To accommodate the piping of the apparatus and other components exterior to the various sections, use is made of interior spaces 86 and 88 within housing 62. See FIG. 4. These spaces are respectively defined by interior walls 90, 92 and interior walls 94 and 96. Like exterior walls of housing 62, the various interior walls are preferably made from 18 gauge sheet steel and may be double walled with an air space or insulation therebetween. It should also be noticed that interior walls 90 and 96 have a height equal to the exterior walls 62a-62d and collectively with the exterior walls and bottom wall 63 define the interior volumes of storage tank 70 and waste tank 80.

Figure 11:
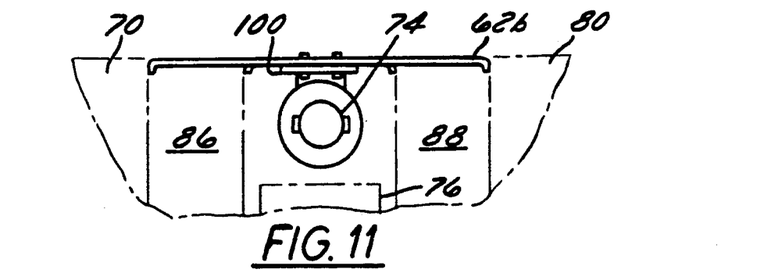
FIG. 11 is a rear view of the apparatus of FIG. 3 showing only the ventilation screen and pump motor mount.
Figure 12:
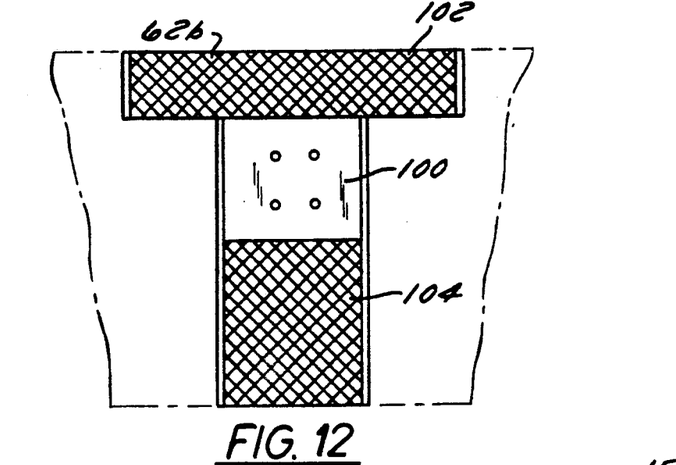
FIG. 12 is a top view of the apparatus of FIG. 3 showing only the pump motor mounted on the back wall thereof.

As may be best seen in FIG. 4, pump section 72 is positioned to the rear of filter housing 76. Pump 74 is mounted by mounting block 100 on rear wall 62b of housing 62 as illustrated in FIGS. 11 and 12. To provide for proper ventilation to pump 74, a portion of rear wall 62b above and below rear wall mounting block 100 are screens 102 and 104. For purposes of this description, pump 74 may be of the type available, for example, from the Haight Pump Division of Baker Manufacturing Company located in Brookfield, Wis. Such pumps are generally constructed from cast iron having a gear pump with an internal relief valve. The relief valve may be set to open at the appropriate pressure to allow proper system operation and safety.

Figure 9:
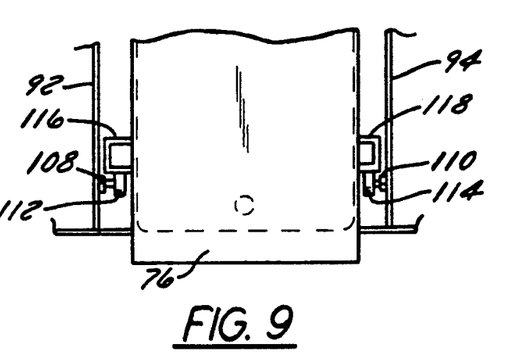
FIG. 9 is a schematic of the slide structure permitting the filter housing to move into and out of position within the housing of the apparatus of FIG. 3.

As indicated in FIG. 4, filter housing 76 is mounted for sliding movement between interior walls 92 and 94 to facilitate easy removal of the filter and cleaning or disposal as may be required. The dashed lines indicate the filter housing 76 in an open position. As is best seen in FIG. 9, rails 108 and 110 with rollers 112 and 114 are welded to the respective filter housing facing surfaces of walls 92 and 94 while the facing surfaces of filter housing 76 are provided with rails 116 and 118. Handle 106 allows the operator to slide the filter housing 76 along rails 108 and 110 between open and closed positions. The filter housing and rails are generally designed for the filter housing 76 to be filled with up to 175 pounds of oil although in actual operation the housing 76 will generally be empty.

The front of panel 82 mounts a plurality of push-pull knobs reading from left to right as knobs 122, 124, 126, 128, 130, 132, 134, and 136. This is best seen in FIG. 3. Each knob is connected to a valve as discussed below. By pulling a knob, an associated valve is manually opened. Pushing the knob into contact with the front of the panel closes its associated valve. Switch 137 appropriately connected to a source of electrical power serves to energize or de-energize pump 74.

Figure 13:
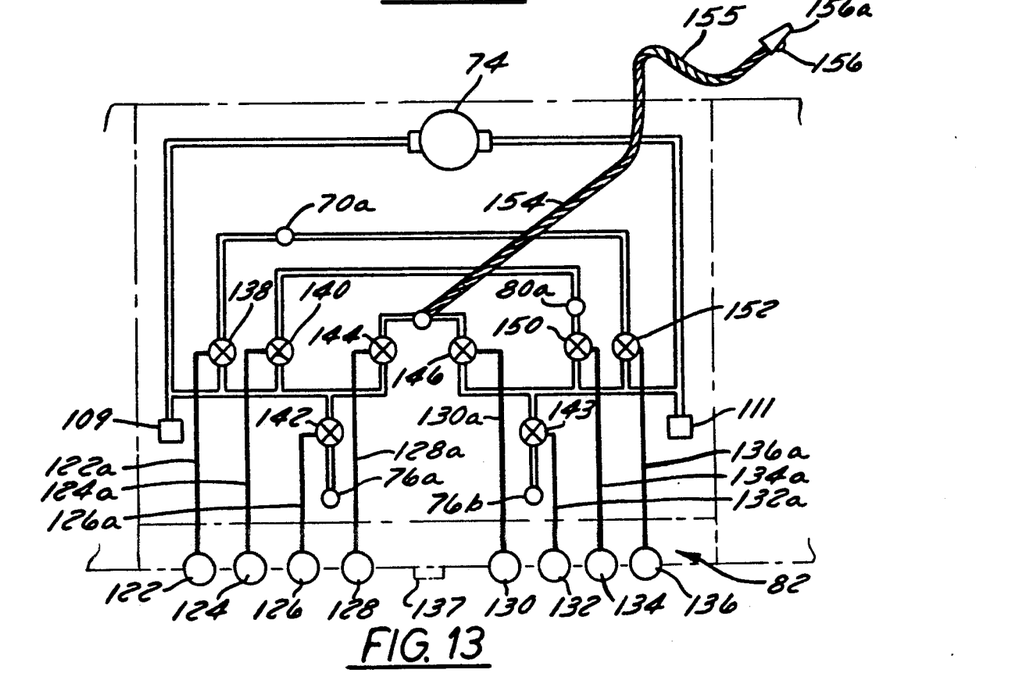
FIG. 13 is a schematic of the valves and piping of the apparatus of FIG. 3 viewed from the top.

FIG. 13 sets forth in schematic form the structure of the piping and valves between the various sections of the apparatus and operating panel 82. Use is made of a solid circle to denote the juncture between various pipe lines in the plane of the drawing with pipe lines out of the plane. For example, the junction with the pipe line going into storage tank 70 is shown by junction 70a. Similarly, junction 80a is with the pipe line 81 going into waste tank 80. Filter housing 76 requires separate pipe line for entrance and exit of the liquid as shown by junctions 76a and 76b. A pair of quick connection couplings 109 and 111 are provided to attach the apparatus 60 to a remote source of oil or disposal tank having convenient access to tankers and the like.

Figures 15, 16:
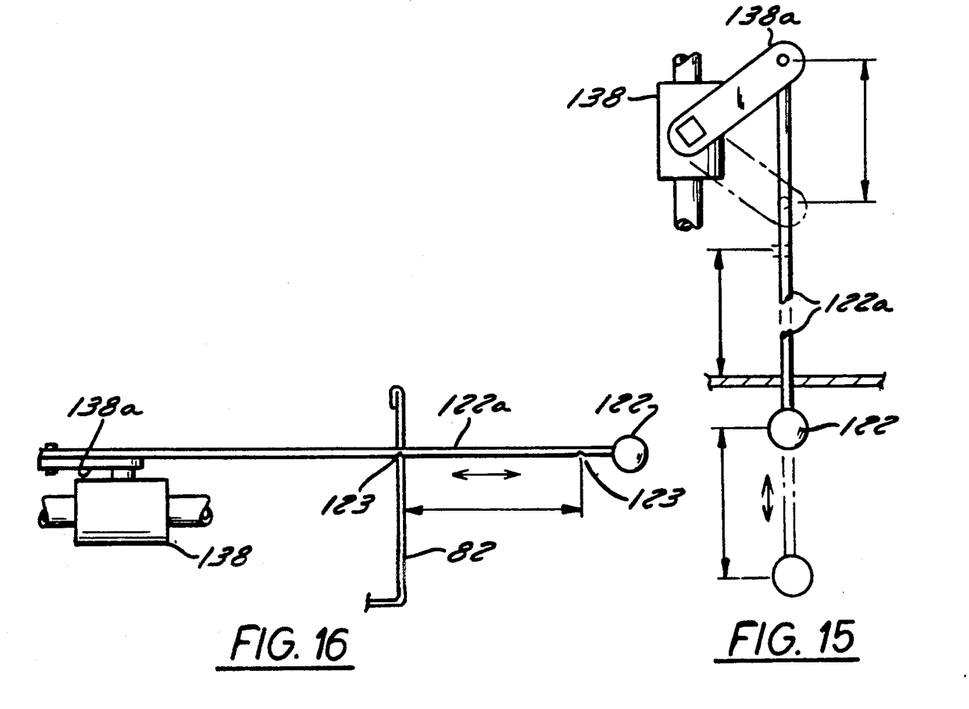
FIG. 15 is a top view of a valve and operating rod structure that may be used in the apparatus of FIG. 3 to open and close the valves.
FIG. 16 is a side view of the valve and operating rod structure of FIG. 15.

The various valves 138, 140, 142, 144, 146, 148, 150, and 152, are indicated by standard schematic nomenclature for fluid circuits, i.e, a crossed circle. The valves 138-152 are preferably similar to the "APOLLO" series No. 72-103 or 72-104 valves available from Conbraco Industries. ("APOLLO" is a registered trademark of Conbraco.) Such valves, well known in the industry, may be manually opened or closed by an operating rod linked to a lever arm of the valve. Each valve 138-152 is linked to a respective knob 122-136 by a respective operating rod 122a-136a. The operating rods are mounted for sliding movement toward and away from the front wall of housing 62 and the front wall of panel 82. FIGS. 15 and 16 depict a linkage structure suitable for the operating of valves 138-152. For example, operating rod 122a is pivotally connected to lever arm 138a of valve 138, thus operatively connecting knob 122 to valve 138. By pushing or pulling knob 122 between the travel limits imposed by notches 123 on rod 122a (or alternatively protuberances on the rod) in cooperation with the front of panel 82, the lever arm 138a of valve 138 can be moved, thus opening or closing valve 138 as desired. Each of the other valves can be operated manually in a similar manner.

Referring back to FIG. 13, it may be seen that valves 138 and 152 represent respectively the exit and input valves to storage tank 70. Similarly, valves 124 and 134 represent respectively the exit and input valves to waste tank 80; valves 126 and 132 represent respectively the exit and input valves to filter housing 76; and valves 128 and 130 represent respectively the exit and input valves to pipe lines 154. Pipe line 154 is connected to a flexible hose 155 containing a squeezable trigger valve 156 with a nozzle 156a capable of being inserted into a fryer vat.

Figure 10:
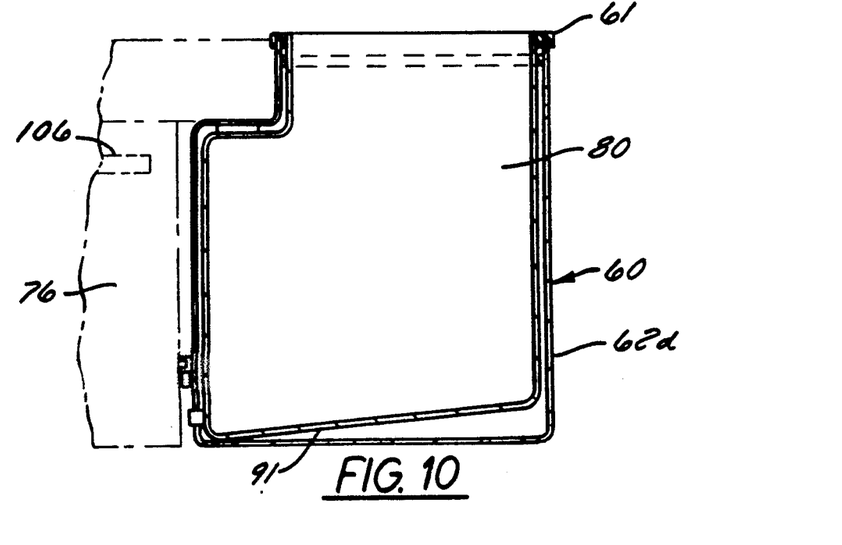
FIG. 10 is a front view of FIG. 3 showing the sloping of the waste tank toward the filter housing.
Figure 14:
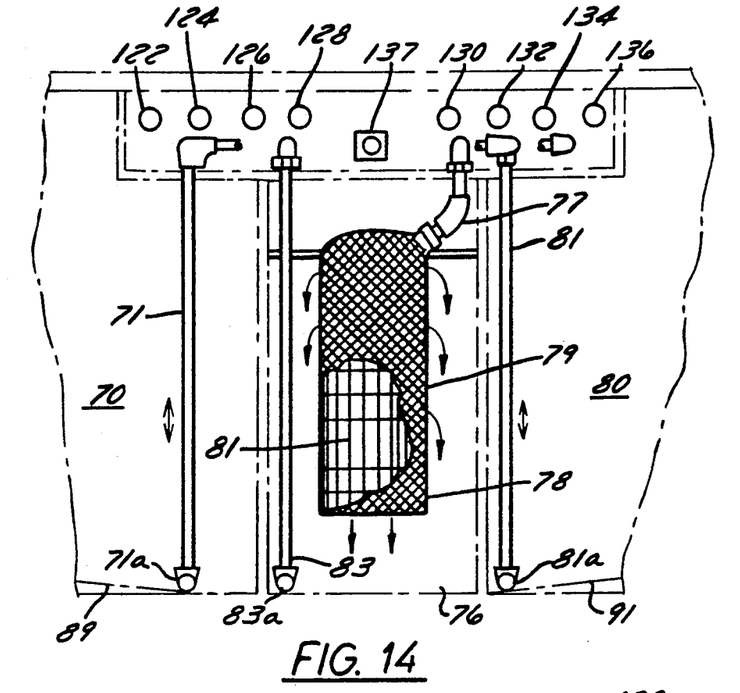
FIG. 14 is a schematic of the valves and the piping shown in FIG. 13 viewed from the front.

From FIGS. 10 and 14, it may be seen that pipe lines 71 and 81 representing the inlet and outlet pipelines for the storage tank 70 and the waste tank 80 extend downward along the interior sides of their respective tanks and terminate with open distal ends 71a and 81a adjacent the respective bottom surfaces 89 and 91 of the tanks 70 and 80. Because surfaces 89 and 91 are respectively sloped toward distal ends 71a and 81a, essentially all of the liquid in each tank can be effectively removed.

Figure 7:
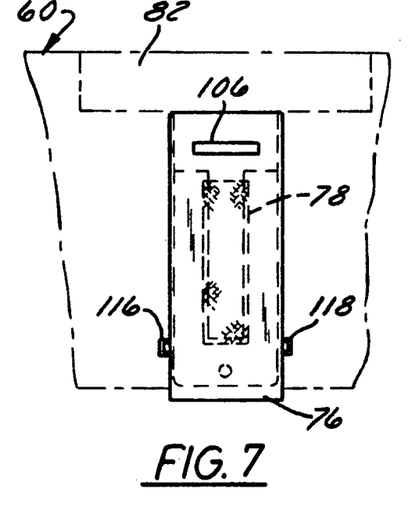
FIG. 7 is a front view of the apparatus of FIG. 3 showing only the filter section and the filter bag.
Figure 8:
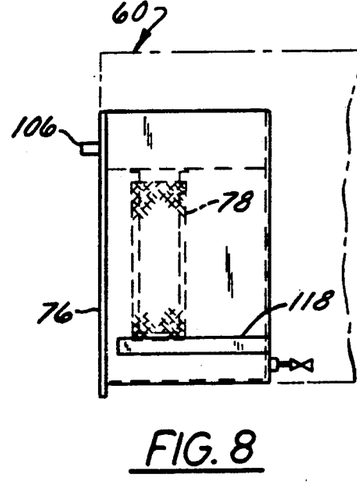
FIG. 8 is a front elevation view of the filter section of the apparatus of FIG. 3 showing the handle for the movable filter housing.

FIG. 14 further illustrates the connection of a filter 78 to the inlet pipe line 77 into filter housing 76. Since it is desirable to be to remove filter 78 for replacement or cleaning, it has been determined that by locating filter inlet pipe line 77, its attached filter 78 and filter outlet pipeline 83 forward within housing 76 a predetermined distance, housing 76 can move forward without obstruction. As best seen in FIGS. 7, 8, and 14, filter inlet line 77 preferably is canted down at an angle, for example, of about 45° to horizontal in filter housing 76. Filter 78 may be a bag filter 79 suitable fitted around and tied to a wire cage 81 releasably attached to line 77 so as to cause all oil entering housing 76 to pass through the filter media of filter 78. The open distal end 83a of pipeline 83 is positioned adjacent the bottom of filter housing 76 to promote good circulation. When filter bag 81 becomes impregnated with particles, filter cage 79 can be detached from line 77 when housing 76 is open and the bag either cleaned or replaced as desired.

In operation the apparatus 60 functions in a manner similar to the above description of the system. That is, fresh oil can be pumped to storage tank 70 when pump 74 is energized, attachment 109 is coupled to a fresh oil supply line leading to a remotely located vehicular tank and knob 136 is pulled, opening storage tank entrance valve 152. The remainder of the knobs are pushed in, ensuring that all other valves are closed. When the tank is filled to predetermined level, valve 152 is closed and attachment 109 is decoupled.

While attachments 109 and 111 are shown to be adjacent to or otherwise close to the housing of the apparatus, it should be understood that the distance to the housing from the attachments is a matter of choice and could be located in an entirely separate facility from the kitchen being serviced by the apparatus. Additionally, attachments 109 and 111 may, for example, be either female or male attachments with check valves biased in a closed position that prevents flow of liquid in the opposite direction from that desired and covered by a threaded cap to further prevent flow when not being used.

To transfer oil from tank 70 to pipe line 154 and ultimately to a fryer vat, the operator must open valves 138 and 146. This establishes a pipe path from storage tank through pump 74 to line 154. Flexible hose 155 with the squeezable trigger 156 with nozzle 156a is inserted into the target fryer vat and trigger valve 156 is squeezed open, placing the desired amount of cooking oil directly into the fryer vat.

To move used oil from a fryer vat to filter housing 76, valves 144 and 148 are pulled open via the associated knobs and trigger valve 156 is placed into contact with the used oil in the selected vat and opened. Used oil is then pumped through the pipe extending from the vat through pump 74 into housing 76 until the oil in the vat has been completely removed. Used oil entering housing 76 must pass through filter 78. To cause the oil to pass through filter a number of times, knobs 126 and 132 are pulled, opening both filter entrance and exit valves 142 and 148. Oil thus is continuously pumped in a looped pipe path from housing 76 through pump 74 back to housing 76 where it passes through filter 78 before exiting again to pump 74. The multipass filtering action continues until the oil is effectively cleaned of the carbon particles resulting from the cooking process.

Once the oil either in the fryer vat or filter housing 76 is observed as being too dark to further use in cooking, an indicia of degradation, the used oil may be pumped directly to waste tank 80 either from filter housing 76 or from a fryer vat itself. In the case of pumping direct from the fryer, the operator first opens valves 144 and 150 by pulling knobs 128 and 134, then inserts trigger valve 156 into the used oil in the target fryer vat and opens the same. Oil is then transferred directly to waste tank 80. Pumping directly from the filter section 76 requires the opening of valve 140 and 150 by pulling knobs 124 and 134.

To rid apparatus 60 of waste oil, attachment iii is coupled to a waste disposal line leading, for example, to a tank mounted on a vehicle or some other storage facility for waste oil remote from the kitchen facility. Knob 124 is pulled, opening waste tank exit valve 140, allowing the used oil to be pumped through attachment 111 into the waste disposal line.

Figure 17:
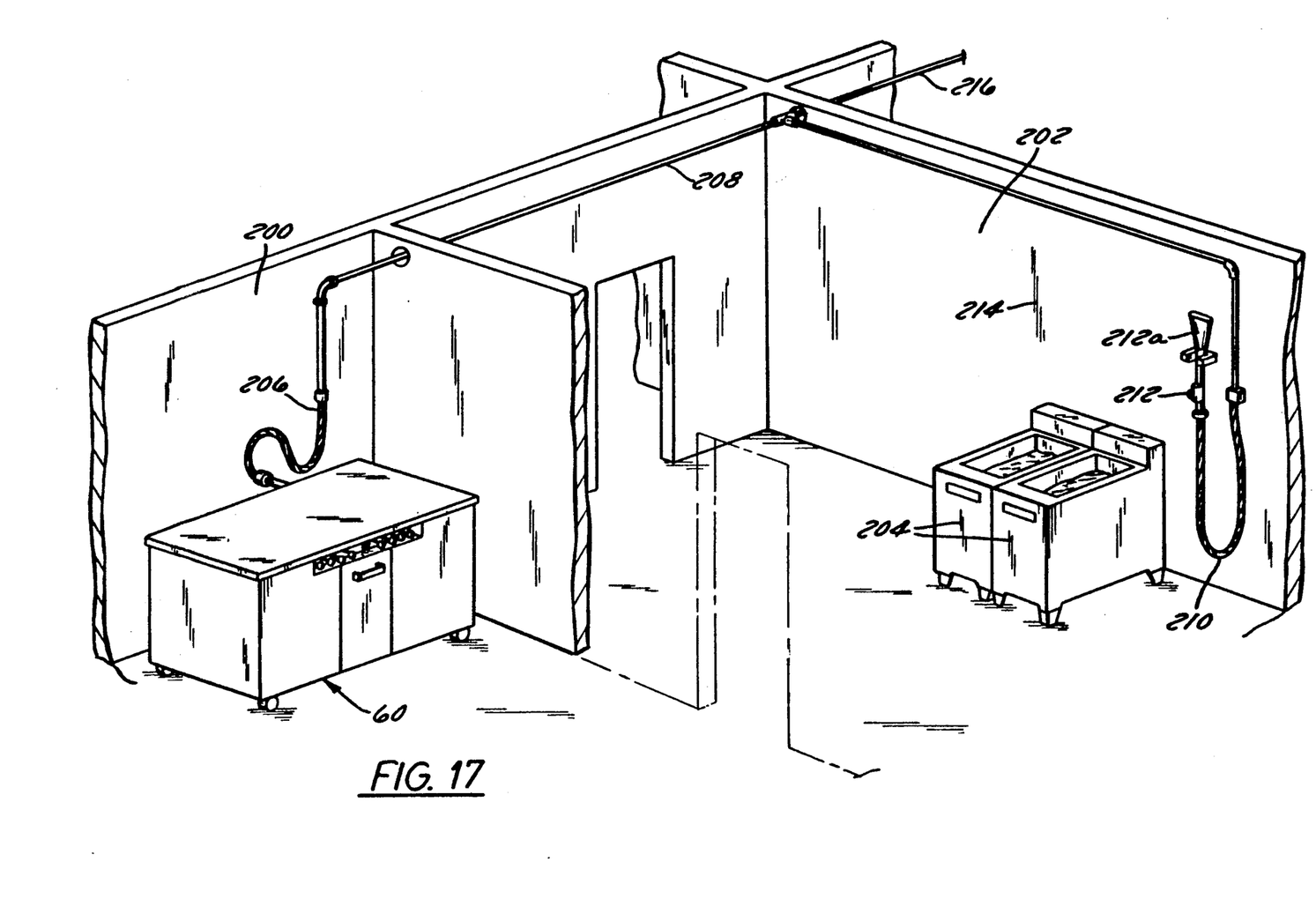
FIG. 17 is a perspective view of the apparatus of FIG. 3 arranged and positioned within a facility for use with fryer vats.

FIG. 17 places the apparatus described above in a remote facility for convenient use illustrating the versatility of the apparatus. As is depicted, apparatus 60 is located in a room 200 displaced from a room 202 in which a pair of fryer vats 204 are positioned. A flexible hose 206 coupled to apparatus 60 is connected to a pipe line 208 and flexible hose 210 leading to trigger valve 212 and nozzle 212a removably mounted appropriately on a wall 214 adjacent vats 204. An operator may thus remove flexible hose 210 and trigger valve 212 from its mounting and insert nozzle into one of the vats 204 as desired for the cycle selected. Additionally, apparatus 60 may service still other fryer vats located in still other areas through the extension 216 of pipe line 208.

From the above it may be seen that a system and apparatus for the distribution and recycling of cooking oil has been described that addresses the objects previously set forth. It is clear that those skilled in the art will be able to modify the embodiments of the present invention as described herein in view of the teachings of this disclosure. For example, other and different valve arrangements may be employed. The various operation cycles and manually operated valves may be completely or partially automated, using microprocessor based controls. Automated timing sequences may be incorporated into the system or apparatus. These and other changes within the spirit of the attached claims will become evident following a reading of the description herein.

We claim:

1. A bulk cooking oil system having various stations connected by piping for movement of oil along preselected pipe paths comprising:
   (a) a filter station including
      (i) means for filtering cooking oil from said fryer station and
      (ii) filter valve means for opening and closing pipe lines leading to and away from said filter station;
   (b) a waste station including
      (i) means for storing used oil and
      (ii) waste valve means for opening and closing a pipe line leading to and away from said waste station;
   (c) a supply station including (i) means for storing oil to be used at said fryer station for cooking food products and
(ii) supply valve means for opening and closing a pipe line leading to and away from said supply station;
(d) a fryer station including
(i) a fryer for receiving and heating cooking oil to cook food products,
(ii) fryer valve means for opening and closing a pipe line leading to and from said fryer station, and
(iii) means for metering oil to said fryer in predetermined amounts;
(e) control means for selectively operating said filtering, waste supply and fryer valve means and for selecting a pipe path between a predetermined pair of said stations;
(f) pump means for moving oil along said selected pipe path.

2. The system of claim 1 wherein said filter valve in response to said control means is in an open state in which the pipe line leading to and away from said filter station is open and wherein said waste valve mean, said supply valve means and said fryer valve means in response to said control means are all in closed states in which the respective pipe lines leading to and away from said waste station, supply station and said fryer station are closed thereby forming a looped pipe path between said filter station and said pump.

3. The system of claim 2 in which said filter valve means is a pair of valves.

4. The system of claim 3 in which said filter station includes a removable filter for removing large carbon particles in the cooking oil when circulated therethrough.

5. The system of claim 2 wherein said filter valve means and said fryer valve means in response to said control means open pipe lines forming a pipe path from said fryer station to said filter station whereby oil is moved along the path by said pump means.

6. The system of claim 1 in which said pump means is a single pump for moving the oil.

7. The system of claim 6 in which said pump is a continuously operating pump having means responsive to pressure in said system for opening a pipe path between the egress and exit of said pump.

8. Apparatus for the distribution and recycling of cooking oil comprising:
(a) a first container for receiving and storing cooking oil;
(b) a second container adapted to receive and store waste cooking oil;
(c) a filter unit for housing a filter used to filter particles in used cooking oil;
(d) first and second coupling attachments adapted respectively to be coupled to lines leading to a fryer and to egress from said apparatus;
(e) piping network interconnecting said first and second containers, said filter unit and said first and second couplings;
(f) pipe path control means for determining a pipe path within said piping between a pair selected from among said first and second containers, said filter unit and said first and second coupling attachments; and
(g) pump means for circulating cooking oil along said selected path.

9. Apparatus of claim 8 wherein said network of piping includes a first pipe line leading into said first container for distributing oil to and removing oil from said container and a second pipe line leading into said second container for distributing oil to and removing oil from said second container.

10. The apparatus of claim 9 wherein said first pipe line extends downwardly along one side of said first container and has an open distal end positioned adjacent the bottom surface of said first container, said bottom surface sloping downwardly toward said distal end.

11. The apparatus of claim 8 in which said filter is removable from said filter unit.

12. The apparatus of claim 11 in which said filter unit is movable with respect to said apparatus a distance sufficient for an operator to remove said filter.

13. The apparatus of claim 12 including a filter exit pipe line for removing oil from said filter unit, said filter exit pipe line extending downwardly into said filter unit and having a distal end adjacent the bottom surface of said filter unit, said apparatus further including a filter entrance pipe line communicating with said filter unit for distributing oil to said filter unit, said filter exit pipe line and said filter entrance pipe line positioned a predetermined distance from the back wall of said filter unit to allow unimpeded movement of said filter unit.

14. The apparatus of claim 12 in which said filter unit encompasses a distal open end of said filter entrance pipe line thereby forcing oil being circulated through said filter unit to pass through said filter.

15. The apparatus of claim 8 in which said pipe path control path means comprises a multiplicity of manually movable operating rods coupled to said valves for opening and closing said valves.

* * * * *